(12) United States Patent
Fazekas

(10) Patent No.: US 6,675,828 B2
(45) Date of Patent: Jan. 13, 2004

(54) NEXTROL

(76) Inventor: Dale J. Fazekas, 9212 Kinlock Dr., Indianapolis, IN (US) 46256

( * ) Notice: Subject to any disclaimer, the term of this patent is extended or adjusted under 35 U.S.C. 154(b) by 250 days.

(21) Appl. No.: 09/863,285

(22) Filed: May 24, 2001

(65) Prior Publication Data

US 2002/0007853 A1 Jan. 24, 2002

Related U.S. Application Data

(60) Provisional application No. 60/208,578, filed on Jun. 2, 2000.

(51) Int. Cl.[7] .............................................. F16K 37/00
(52) U.S. Cl. ...................... 137/552; 137/544; 137/550; 251/148
(58) Field of Search ................. 137/552, 544, 137/550; 251/366, 367, 148

(56) References Cited

U.S. PATENT DOCUMENTS

| | | | | | |
|---|---|---|---|---|---|
| RE20,987 E | * | 1/1939 | Routh | .......................... | 137/552 |
| 2,655,041 A | * | 10/1953 | Jacobsson | .................... | 137/550 |
| 4,245,669 A | * | 1/1981 | Schmidt | ...................... | 137/550 |
| 6,076,545 A | * | 6/2000 | Cooper | ........................ | 137/360 |
| 6,089,263 A | * | 7/2000 | Dumser | ...................... | 137/552 |

* cited by examiner

Primary Examiner—A. Michael Chambers
(74) Attorney, Agent, or Firm—Morgan & Finnegan, L.L.P.

(57) ABSTRACT

An instrument station in the form of a single-piece body is provided that incorporates ports for a flow measuring device or a piping accessory, including a thermometer, a drain valve, an air vent, a pressure or temperature transmitter, or other measuring device. A balancing type valve may be connected to the instrument station to allow the flow to be adjusted. The instrument station has an inner specific diameter and is attached to a pipe with an equal inner diameter. The pipe section typically has a length that is at least the sum of five inner specific diameters of the body of the instrument station.

21 Claims, 5 Drawing Sheets

NEXTROL

RELATED APPLICATIONS

This application claims the benefit of Provisional Application No. 60/208,578, filed Jun. 2, 2000.

FIELD OF THE INVENTION

A single-piece body instrument station with ports therethrough to accommodate measurement devices and piping accessories is described herein.

BACKGROUND

Currently, instrument stations are constructed with accessory ports that are manually installed at a job site in a pipe by drilling and welding procedures. Such "on the job" installation increases the likelihood of improperly sized or irregular ports, misplaced or misaligned ports, delay during installation, or other such disadvantages. These imprecise installation disadvantages can result in inaccurate measurements by measuring devices and piping accessories.

The Nextrol instrument station overcomes these disadvantages by providing an instrument station having a single-piece body that incorporates ports for measuring devices and piping accessories, such as a thermometer, a drain valve, an air vent, a pressure or temperature transmitter, or other measuring device. A balancing type valve may be connected to the instrument station to adjust the flow.

SUMMARY

The Nextrol instrument station described herein has a single-piece body that includes accessory ports. Such an instrument station eliminates an installer's burden of acquiring and separately fabricating the parts onto a piping system. Although each port on the instrument station has a particular suitability for a particular measuring type device or piping accessory, the ports could be used with any desired device. In one embodiment, the Nextrol instrument station includes ports particularized for utilized measuring devices or piping accessories used to measure flow in a flow system. In fact, in many instances the measuring devices or piping accessories utilized or included herein are required in such systems, for example, to pipe up a water coil or in a centrifugal pump station, where gauges and thermometers are needed for measurement across the device to observe the flow.

The Nextrol instrument station has particular applicability in the Heating, Ventilating, and Air Conditioning (HVAC) industry and specifically involving the piping of water for cooling and heating systems. However, the Nextrol could be utilized in any field of endeavor where measurement of flow would be beneficial, for example, in an oil field or a gas field. Typically, the Nextrol is installed in a hot or chilled water piping system to monitor and measure flow, in which measurement can be expressed in the form of gallons per minute (GPM).

The Nextrol differs from the prior art systems in numerous ways, but is especially beneficial because the accessory ports therein are in a single-piece body. The body of the instrument station can be constructed of any desired material, but is usually constructed of cast or forged metal or molded plastic. The Nextrol instrument station is typically constructed of cast iron with 125 lb. rated flanges that house drilled accessory ports and tapped National Pipe Thread (NPT) threads.

Thus, the Nextrol instrument station provides an accurate measurement device with precision constructed ports to provide exact measurements of flow characteristics. Additionally, by using a single-piece body with available accessory ports, an installer will save labor and fitting costs and reduce the space and time required for installing the accessory measuring devices or piping accessories.

Accordingly, the Nextrol instrument station is directed to resolving these and other problems in conventional instrument stations in piping systems.

DETAILED DESCRIPTION OF THE PREFERRED EMBODIMENTS

Figure 1:
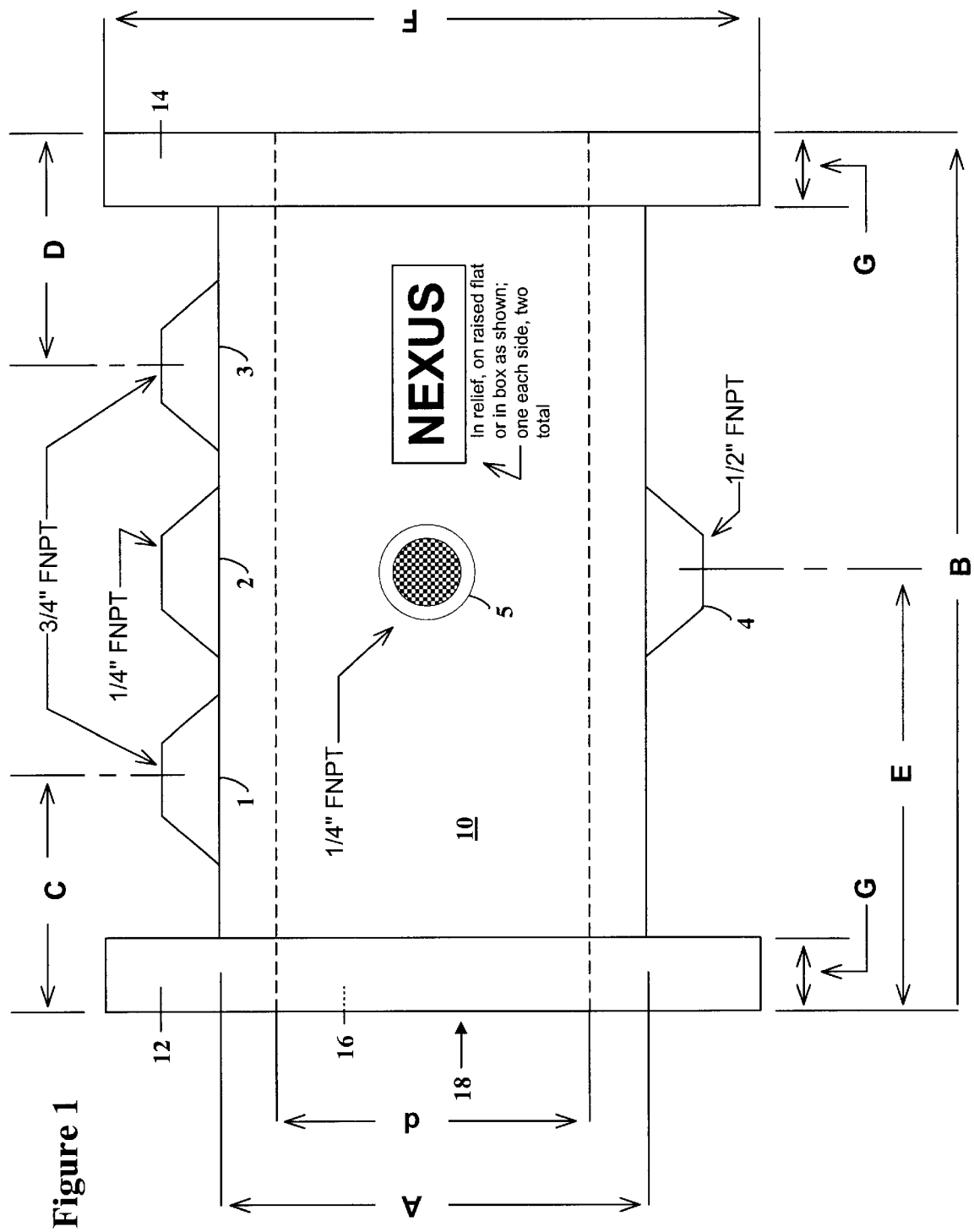
FIG. 1 is a diagram of the Nextrol instrument station with access ports.

FIG. 1 is a diagram of the Nextrol instrument station with access ports. The Nextrol is in the form of a single-piece body 10, with end connections 12 and 14 through which passage 16 accommodates fluid flow 18. (One skilled in the art will recognize that the end connections to attach the Nextrol to any apparatus discussed herein can be flanged, grooved, threaded, soldered, or socketed, but are shown throughout herein as flanges for consistency.) Body 10 has ports, which permit access to measuring devices or piping accessories. Although there can be any number of ports on the body 10 and although the ports can be utilized with any intended alternative devices, the Nextrol is shown in FIG. 1 with five ports 1, 2, 3, 4, and 5 and with each port having a recommended port use. Port 1 is recommended for use with a flow measuring device 101, such as a pitot tube, port 2 is recommended for use with a manual air vent 102, port 3 is recommended for use with a thermometer 103, port 4 is recommended for use with a drain valve 104, and port 5 is recommended for use with a transmitter port 105. (One skilled in the art will recognize that the ports in the body 10 can be threaded, soldered, or socketed. For simplicity herein, the ports are displayed as holes that accommodate measuring devices or piping accessories 101, 102, 103, 104, and 105 for measurement purposes.)

Figure 3:
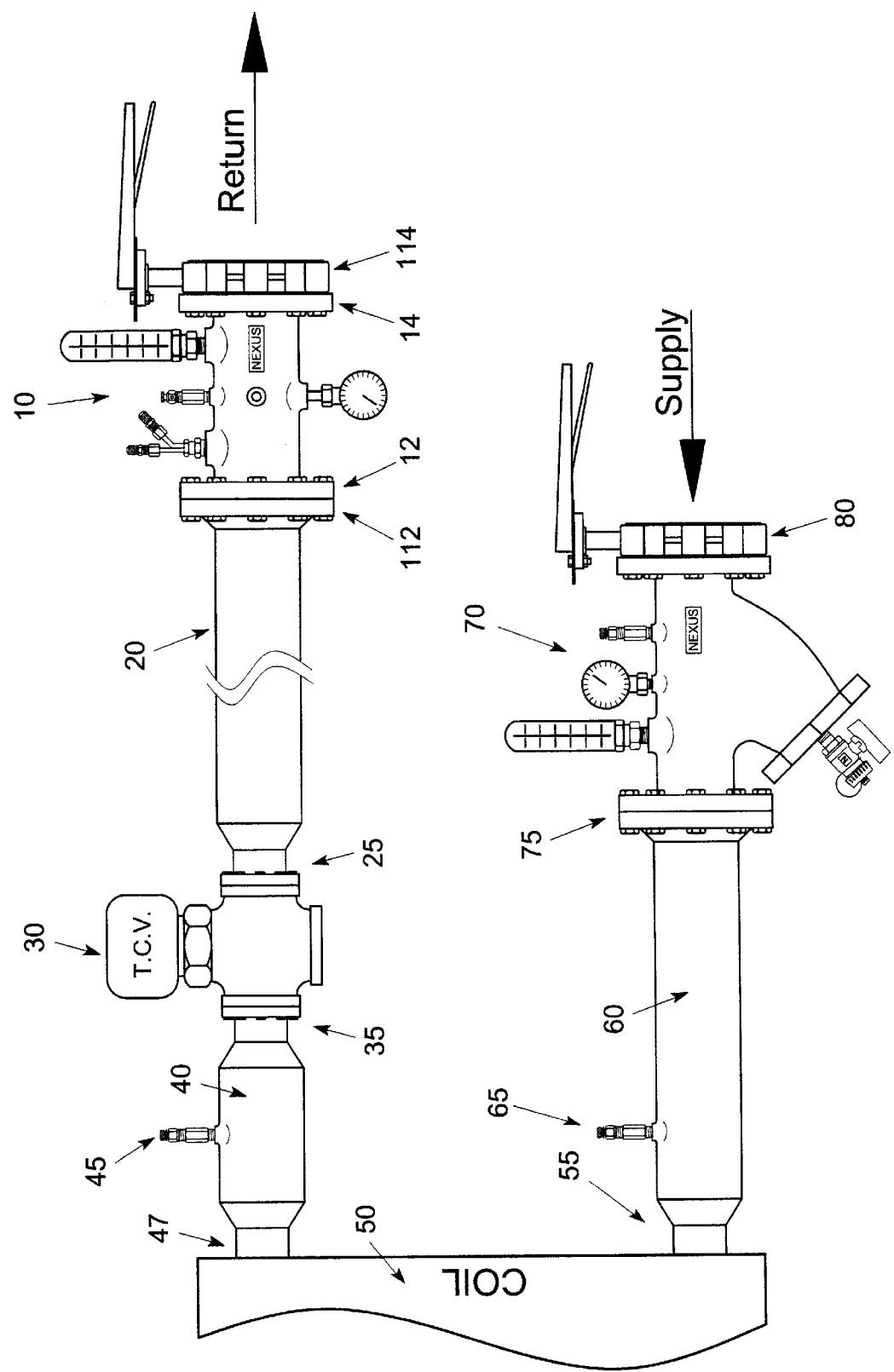
FIG. 3 is a flow diagram of a system using the Nextrol instrument station.
Figure 4:
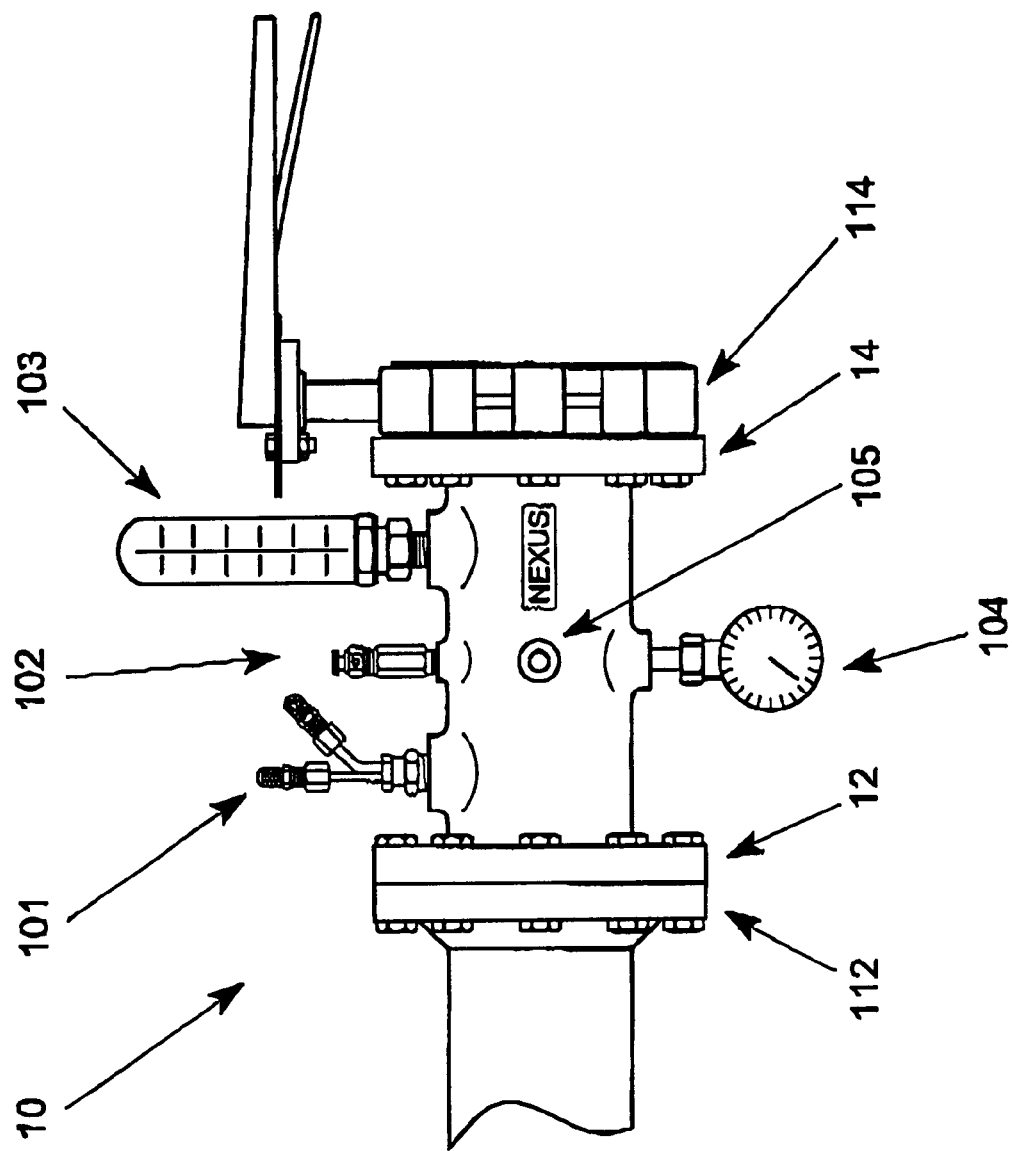
FIG. 4 is a diagram of the Nextrol instrument station with measuring devices and piping accessories in respective access ports.

In one embodiment, end connection 12 is attached to a pipe section and end connection 14 has a valve or other apparatus attached thereto. For example, as shown in FIGS. 3 and 4, end connection 12 is attached to pipe section 20 at pipe section end connection 112 and return side isolation/balance valve 114 is attached to end connection 14. The valve 114 has a plate on top capable of being set to any position, including to an infinite position, i.e., 90 degrees, in order to arrive at a desired flow. The balancing valve can be a butterfly, plug, globe or ball type valve and can adjust the flow by resetting the opening of the valve. The Nextrol is normally used in conjunction with a balancing valve.

For accurate measurement purposes, the flow measuring device 1 should be a minimum of two inner specific body diameters from the balancing valve. Thus, the flow measuring device 1 could be more than two inner specific body diameters from the balancing valve, since the further distance away the flow measuring device is from the balancing valve, the more accurate the obtained flow measurement. However, the further distance the flow measuring device is from the balancing valve, the larger the resulting instrument station (the length of the body inherently increases proportional to the distance increases for the flow measuring device). To measure the flow, other flow measuring devices can include a pitot tube, orifice, rotary, venturi, coin type, magnetic, turbine, vortex, tapered tube, or a similar type of device capable of measuring flow.

Passage 16 has an inner specific diameter (d) equal to the inner diameter of the pipe onto which the Nextrol is attached. It is important for the Nextrol to have an inner specific diameter equal to the pipe section 20 in order for the measuring devices or piping accessories to measure true flow conditions. Thus, the inner specific diameter will allow measurement of the static velocity, kinetic velocity, etc. of the fluid flow and will measure in the fluid flow through the system. Although any functional pipe inner specific diameter is capable of being manufactured, traditional pipe sizes will normally dictate the inner specific diameter of passage 16. Thus, as explained in further detail below in reference to FIGS. 2a and 2b, the size of the Nextrol to be used in a particular application and the number of connection holes 15 will vary according to the inner specific diameter of passage 16. Since the inner specific diameters of the pipe section 20 and passage 16 are equal, fluid flow 18 can pass from pipe section 20 into passage 16 of the Nextrol and measuring devices or piping accessories 101, 102, 103, 104, and 105 can evaluate the fluid flow through ports 1, 2, 3, 4, and 5.

For example purposes only, sample dimensions of the Nextrol instrument station are provided for traditional pipe sizes with inner specific diameters of 2.5 inches, 3 inches, 4 inches, 6 inches, and 8 inches in Table 1.

TABLE 1

| Pipe Size | Dimensions (in) | | | | | | | | |
|---|---|---|---|---|---|---|---|---|---|
| | d | A | B | C | D | E | F | G | WT(#) |
| 2½" | 2.469 | 3.25 | 8 | 2 | 2 | 4 | 7 | 0.69 | 18.7 |
| 3" | 3.068 | 3.96 | 9 | 2 | 2 | 4.5 | 7.5 | 0.75 | 24.6 |
| 4" | 4.026 | 4.8 | 12 | 3 | 3 | 6 | 9 | 0.94 | 38.9 |
| 6" | 6.065 | 6.9 | 16 | 3 | 3 | 8 | 11 | 1 | 65.3 |
| 8" | 7.981 | 9.05 | 20 | 3 | 4 | 10 | 13.5 | 1.13 | 121.2 |

Figure 2B:
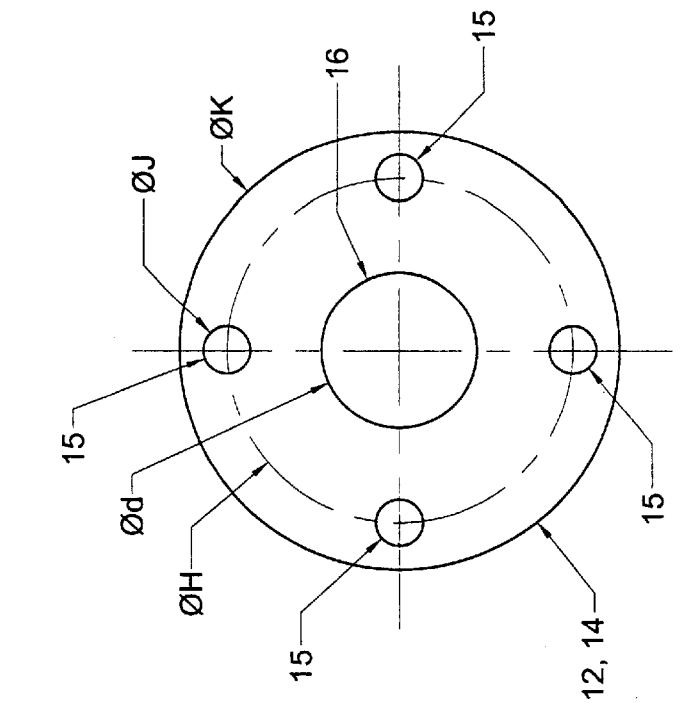
FIGS. 2a and 2b are diagrams of the flow portions of the Nextrol instrument station for various inner specific diameter dimensions.
Figure 2A:
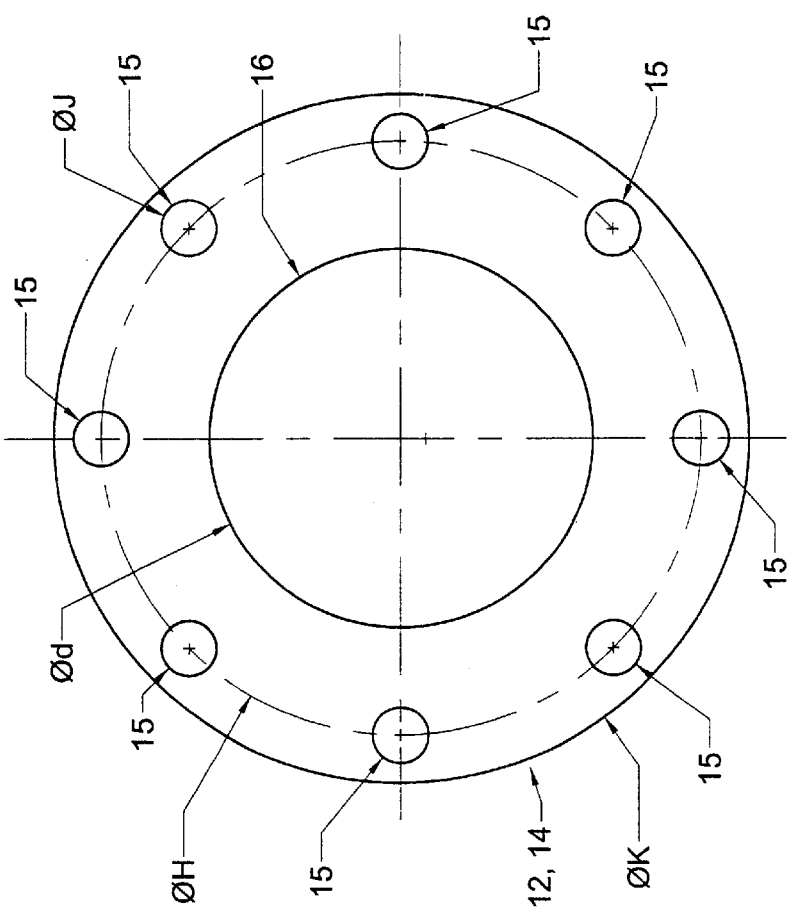

FIGS. 2a and 2b show a through perspective of the Nextrol including passage 16. The Nextrol as shown in FIG. 2a accommodates larger inner specific diameter pipes than the Nextrol shown in FIG. 2b. FIG. 2a discloses eight connection holes 15 capable of connecting the end connections to their respective attachments. (As stated above, one skilled in the art will recognize that the end connections to attach the Nextrol to any apparatus discussed herein can be flanged, grooved, threaded, soldered, or socketed. For simplicity herein, the end connections are displayed as holes 15 that accommodate bolts 25 for attachment purposes.) Thus, as shown in more detail in FIG. 3, end connection 12 can attach to pipe section 20 at pipe section end connection 112 through respective connection holes 15 and end connection 14 can attach to valve 114 through respective connection holes 15. Likewise, the Nextrol shown in FIG. 2b accommodates smaller inner specific diameter pipes than the Nextrol shown in FIG. 2a and has four respective connection holes 15.

For example purposes only, sample dimensions of the Nextrol instrument station for traditional pipe sizes with inner specific diameters of 2.5 inches, 3 inches, 4 inches, 6 inches, and 8 inches are provided in Table 2. Typically, the 2.5 inch and 3 inch pipe dimensions are more exactly expressed to three decimal places as 2.469 inches and 3.068 inches and are used with the four connection hole Nextrol shown in FIG. 2b. Likewise, the 4 inch, 6 inch, and 8 inch pipe dimensions are more exactly expressed as 4.026 inches, 6.065 inches, and 7.981 inches and are used with the eight connection hole Nextrol shown in FIG. 2a.

TABLE 2

| Pipe Size | Dimensions (in) | | | | |
|---|---|---|---|---|---|
| | d | H | J (qty) | J (ø) | K |
| 2½" | 2.469 | 5.5 | 4 | 0.75 | 7 |
| 3" | 3.068 | 6 | 4 | 0.75 | 7.5 |
| 4" | 4.026 | 7.5 | 8 | 0.75 | 9 |
| 6" | 6.065 | 9.5 | 8 | 0.875 | 11 |
| 8" | 7.981 | 11.75 | 8 | 0.875 | 13.5 |

The operation of the Nextrol is shown in FIG. 3 in a system using the Nextrol. Flow of fluid in FIG. 3 proceeds from the supply side, as shown at the lower end of the diagram, to the return side, as shown at the upper end of the diagram. The flow proceeds through valve 80, which is typically in the form of an isolation or shut-off valve, but can comprise any type valve, including a butterfly valve. The flow then proceeds through strainer 70, Strainer 70 operates to filter the fluid (typically air or water) before it enters the tubes in coil 50. The flow proceeds out of the strainer 70 and through connection 75, which is analogous to the end connections 12, 14, and 112 discussed above in the Nextrol and can be flanged, grooved, threaded, soldered, or socketed.

The flow then proceeds through pipe section 60, which houses a test plug 65. Test plug 65 allows sampling of the fluid before reaching the coil 50 and can include pressure or temperature testing. The flow then proceeds through the pipe/coil connection 55, through coil 50, and through pipe/coil connection 47. The pipe/coil connections 47 and 55 can be any connection capable of affixing a pipe to the coil and since the connections are not a subject of the instrument station described herein, the connections will not be described further. The coil 50 is typically a water coil including a conventional fan, conventional duct work, etc. (not shown), but could be replaced with a substitute apparatus as desired, such as a pump, which will be described in an alternate embodiment below.

The flow then proceeds into pipe section 40, which houses a test plug 45. Test plug 45 allows sampling of the fluid and can include pressure or temperature testing. The flow then proceeds through the connection 35 before reaching the temperature control valve (TCV) 30 and proceeding through connection 25 into pipe section 20. Connections 25 and 35 can be any desired connection to affix the TCV 30 to pipe sections 20 and 40 and since the connections are not a subject of the instrument station described herein, the connections will not be described further. The TCV 30 operates to open and close depending on the requirements of the water flow, is a typical component of the system shown in FIG. 3, and will thus not be described in further detail herein.

The flow continues along pipe section 20, through connections 12 and 112, and into the Nextrol instrument station body 10. The flow then proceeds through connection 14 to return through valve 114. In order to achieve an accurate measurement with the flow measuring device 101, it is preferred that pipe section 20 be provided at a minimum length for the flow measuring device, which is typically five pipe diameters. Thus, for example, if a flow measuring device is to take a measurement in a port (here port 1) in the Nextrol body 10 and the Nextrol is connected to a 6-inch diameter pipe section 20, the pipe section 20 should be a minimum of 30 inches in length. For accurate flow measurements by the flow measuring device, this length can be increased, but should not be decreased, from the minimum five-times diameter length.

While the system of FIG. 3 is in operation with a pitot tube as the flow measuring device 101, the chart on pitot tube can be read to yield inches or millimeters and a differential. Then, a comparison of the full rate at that particular differential pressure will result in the flow. Further, as the valve is throttled, the flow will change, and such change will be able to be read through the pitot tube.

Each of the connections 25, 35, 47, and 55 can be reduced as required depending upon the size of the ports in the coil 50 or TCV 30. This possible required reduction at the connection of the pipe is due to the larger pipe size than connection size at the coil 50 created by manufacturers who typically do not desire the coil to be made any larger than required. The system designer is, however, not as concerned with the coil size as the manufacturer and is more concerned with the pressure drop in the system. To regulate the pressure drop in the system, the system designer provides a larger diameter pipe. Thus, the size of the pipe connections and required reduction can change as a basic matter of cost verses velocity and pressure drop, the cost to pump the water, or the standards of pumps and systems by engineering societies and bureaus.

In another embodiment, a pump (not shown) can replace the coil 50 and TCV 30. A cooling system includes continuous loop systems and a device to add or take heat out of the water. The pump in such a system shown in FIG. 3 would be responsible for circulating the fluid around the system. Further, in such a system with a pump, the strainer 70 could be used on the inlet side of the pump to filter the fluid and provide instrumentation readings. Likewise, the Nextrol instrument station could be used on the discharge side of the pump with an attached balancing valve 114.

FIG. 4 is a diagram of the Nextrol instrument station with example measuring devices or piping accessories in respective access ports. Body 10 of the instrument station is shown with end connection 12 attached to pipe section 20 at pipe section end connection 112 and end connection 14 attached to valve 114. Port 1 is shown with a flow measuring device in the form of a twin tube pitot tube 101, port 2 is shown with a manual air vent 102, port 3 is shown with a thermometer 103, port 4 is shown with a drain valve 104, and port 5 is shown with a transmitter port 105. In another embodiment, a port can be plugged (not shown) in lieu of attaching a measuring device or piping accessory to the port.

Figure 5:
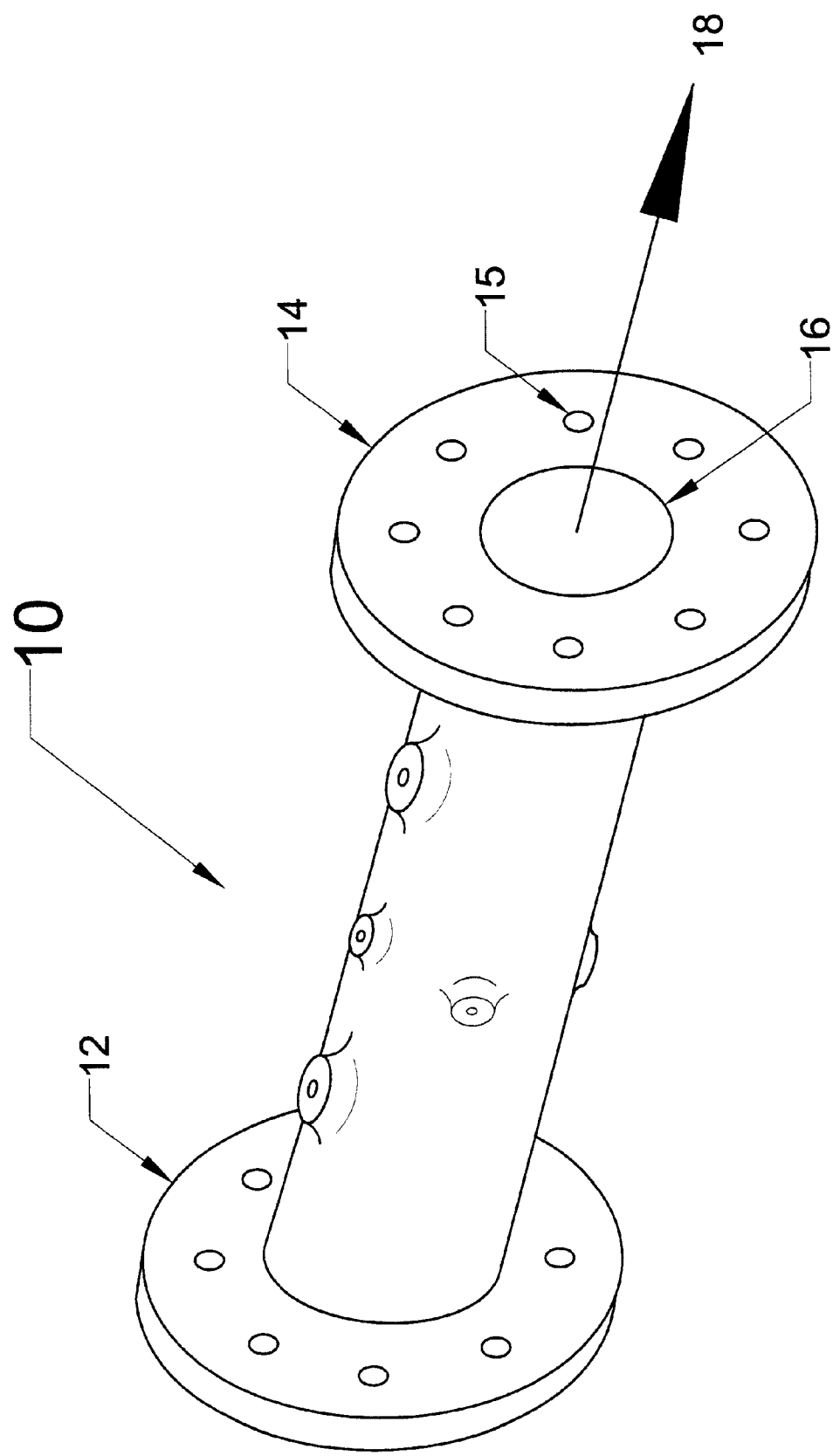
FIG. 5 is a perspective view of the Nextrol instrument station.

FIG. 5 is a perspective view of the Nextrol instrument station showing the fluid flow 18 in the body 10. Also shown in FIG. 5, body 10 includes end connections 12 and 14 shown with connection holes 15 in each respective connection. For simplicity, the Nextrol has been shown in FIG. 5 without measuring devices of piping accessories in the ports and without an attached balancing valve, but it is noted that the fluid flow 18 can pass through passage 16 in the direction and manner described with measuring devices, piping accessories, and a valve attached.

Although the embodiments disclosed herein describe a fully functioning single-piece body instrument station with ports therethrough to accommodate measurement devices and piping accessories, the reader should understand that other equivalent embodiments exist. Since numerous modifications and variations will occur to those who review this disclosure, the single-piece body instrument station with ports therethrough to accommodate measurement devices and piping accessories is not limited to the exact construction and operation illustrated and described herein. Accordingly, this disclosure intends all suitable modifications and equivalents to fall within the scope of the claims.

I claim:

1. An instrument station comprising:
   a single-piece body with an inner specific diameter;
   an inlet connection at an inlet portion of the body having an inlet flange with a 125 psig rating;
   an outlet connection at an outlet portion of the body having an outlet flange with a 125 psig rating; and,
   at least one port in the body;
   wherein each said at least one port provides access to a flow measuring device or a piping accessory.

2. The station of claim 1 further including a valve attached to the outlet connection.

3. The station of claim 2 wherein the valve is a balancing valve.

4. The station of claim 1 wherein the flow measuring device is a minimum distance from the valve.

5. The station of claim 4 wherein the minimum distance is at least two of the inner specific diameters of the body of the instrument station.

6. The station of claim 1 wherein said at least one port includes one, two, three, four, or five ports.

7. The station of claim 6 wherein each said device has a respective recommended port.

8. An instrument station comprising:
   a single-piece body with an inner specific diameter;
   an inlet portion of the body
   an outlet portion of the body; wherein
      at least one of said inlet portion and said outlet portion further comprises a flange with a 125 psig rating;
   at least one instrument port in the body.

9. A system comprising:
   a pipe with a pipe end connection, the pipe end connection having a pipe end connection inner diameter;
   an instrument station including:
      a single-piece body with an inner specific diameter;
      an inlet connection at an inlet portion of the body having an inlet flange with a 125 psig rating;
      an outlet connection at an outlet portion of the body having an outlet flange with a 125 psig rating; and,
      at least one port in the body;
      wherein each said at least one port provides access to a flow measuring device or a piping accessory;
      wherein the inner specific diameter of the body and the pipe end connection inner diameter are equal.

10. A system comprising:
    a pipe with a length and including a pipe end connection;
    an instrument station including:
       a single-piece body with an inner specific diameter;
       an inlet connection at an inlet portion of the body having an inlet flange with a 125 psig rating;
       an outlet connection at an outlet portion of the body having an outlet flange with a 125 psig rating; and,
       at least one port in the body;
       wherein each said at least one port provides access to a flow measuring device or a piping accessory;

wherein the length of the pipe is at least five of the inner specific diameters of the body of the instrument station.

11. A system comprising:
a straining device, a supply pipe, and a fluid movement device, the supply pipe connected between the straining device and the fluid movement device;
a return pipe with a length and a return pipe end connection; and,
an instrument station including:
   a single-piece body with an inner specific diameter;
   an inlet connection at an inlet portion of the body having an inlet flange with a 125 psig rating;
   an outlet connection at an outlet portion of the body having an outlet flange with a 125 psig rating; and,
   at least one port in the body;
   wherein each said at least one port provides access to a flow measuring device or a piping accessory.

12. The system of claim 11 wherein the fluid movement device includes a coil and a temperature control valve.

13. The system of claim 11 wherein the fluid movement device includes a pump.

14. The system of claim 11 wherein the length of the return pipe is at least five of the inner specific diameters of the body of the instrument station.

15. The system of claim 11 wherein the inner specific diameter of the body of the instrument station and the return pipe end connection diameter are equal.

16. The system of claim 11 further including a valve attached to the outlet connection.

17. The system of claim 16 wherein the valve is a balancing valve.

18. The system of claim 11 wherein the flow measuring device is a minimum distance from the valve.

19. The system of claim 18 wherein the minimum distance is at least two of the inner specific diameters of the body of the instrument station.

20. The system of claim 11 wherein said at least one port includes one, two, three, four, or five ports.

21. The system of claim 20 wherein each said device has a respective recommended port.

* * * * *